United States Patent [19]

Linder

[11] 3,997,198
[45] Dec. 14, 1976

[54] SWIVEL JOINT CONSTRUCTION FOR PRESSURE CONTAINING CONDUIT

[76] Inventor: Morris B. Linder, 7525 Park Place - 121, Houston, Tex. 77017

[22] Filed: Feb. 27, 1975

[21] Appl. No.: 553,892

[52] U.S. Cl. .................................. 285/98; 285/111; 285/281; 285/373; 285/351
[51] Int. Cl.² ........................................ F16L 27/00
[58] Field of Search ............ 285/111, 98, 281, 371, 285/373, 351, 332.3

[56] References Cited
UNITED STATES PATENTS

| | | | |
|---|---|---|---|
| 904,673 | 11/1908 | Bideker | 285/281 X |
| 1,885,886 | 11/1932 | Banks | 285/98 |
| 2,341,449 | 2/1944 | Krone et al. | 285/98 X |
| 2,412,394 | 12/1946 | Giles | 285/373 X |
| 2,421,974 | 6/1947 | Vandervoort | 285/281 X |
| 3,532,364 | 10/1970 | Snyder, Jr. | 285/98 |
| R18,906 | 8/1933 | McGuirk | 285/371 X |

Primary Examiner—Andrew V. Kundrat
Attorney, Agent, or Firm—Bard, Springs & Jackson

[57] ABSTRACT

A swivel joint for pressure containing conduits such as movable flow lines may comprise a pair of hub elements each having means establishing interconnection with a section of flow line, the hub elements being abutted in such a manner as to define a flow passage through the swivel joint construction. A thrust flange is formed on each of the hub elements, the flanges being retained within a split housing structure that services to retain the swivel joint in assembly. Rotatable relationship between the hub elements and the body structure is established by a pair of thrust bearings that are interposed between the housing and the respective thrust flanges of the hubs. A lubricating spacer element may be disposed between the thrust flanges of the hubs to prevent the development of friction retardation of swivel movement. The hubs interfit to define a sealed recess within which is received a seal sleeve that is of sufficient length to transition the joint between the abutted hubs. The joint transitioning seal sleeve element corporates with the hub structure to define a pair of opposed seal pockets within which may be received annular primary sealing elements that prevent fluid flowing through the swivel structure from coming into contact with the thrust bearings. Additional annular sealing elements may be retained by the seal sleeve for establishment of secondary seals between the seal carrier and the hubs and further preventing contamination of the bearings by the fluid flowing through the swivel structure. The body structure is provided with lubrication fittings providing for lubrication of the thrust bearings.

18 Claims, 7 Drawing Figures

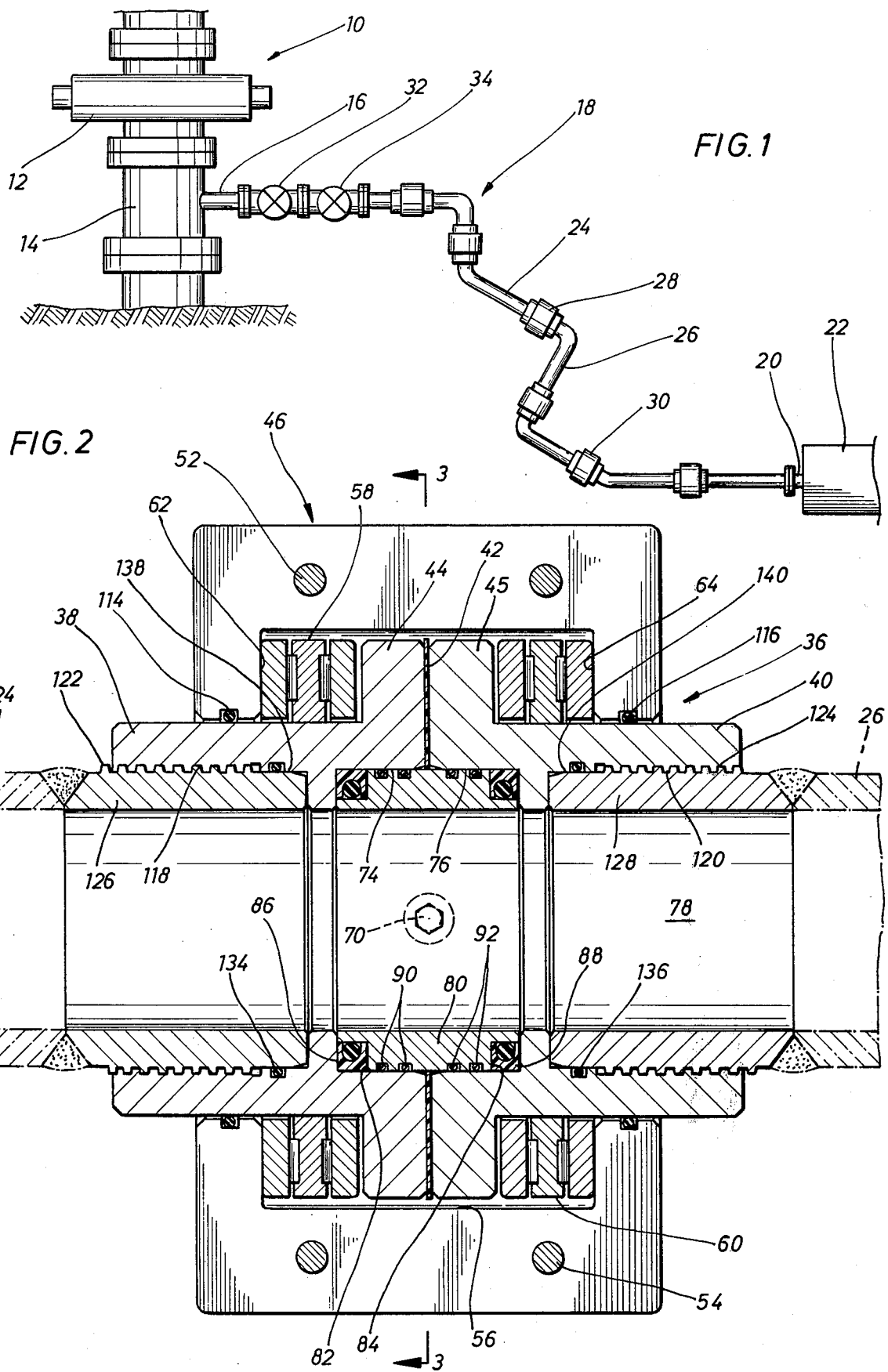

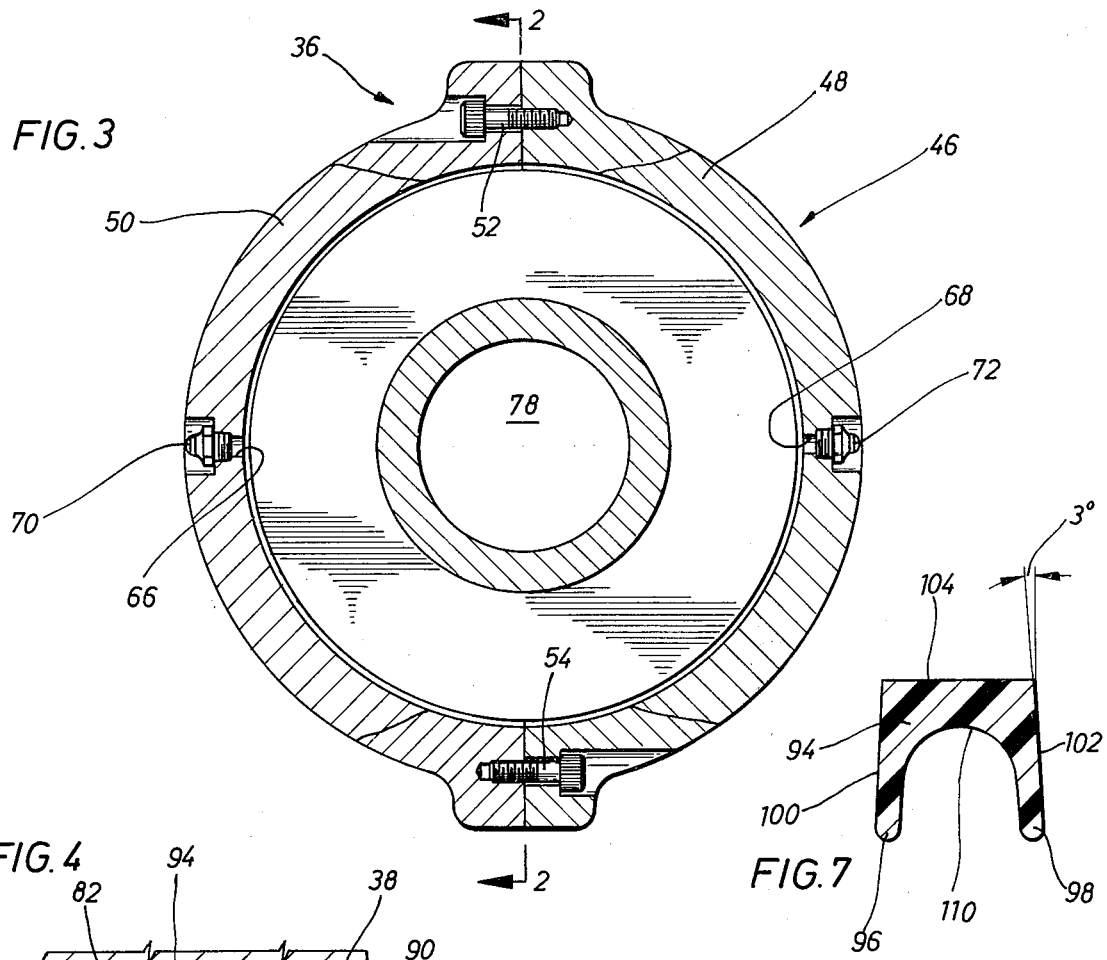
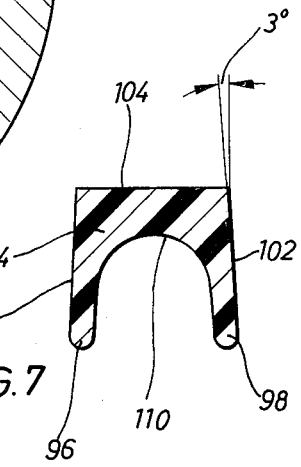
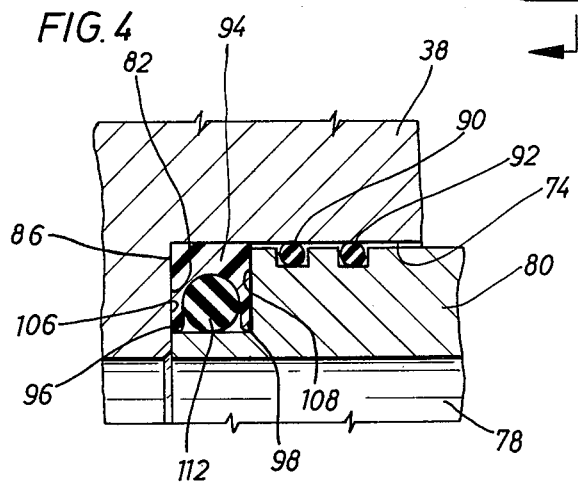
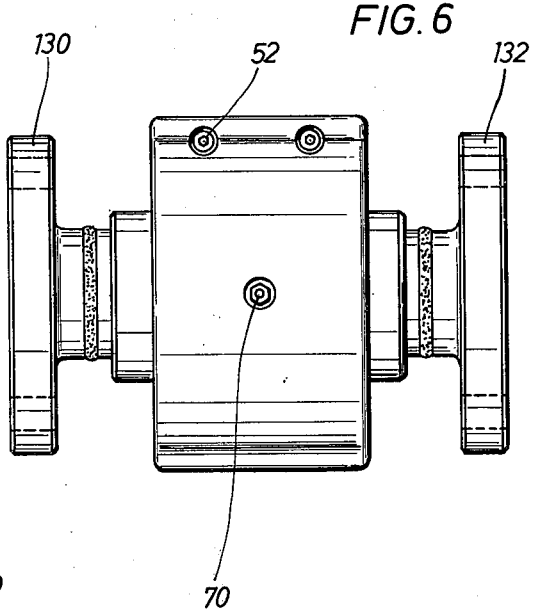
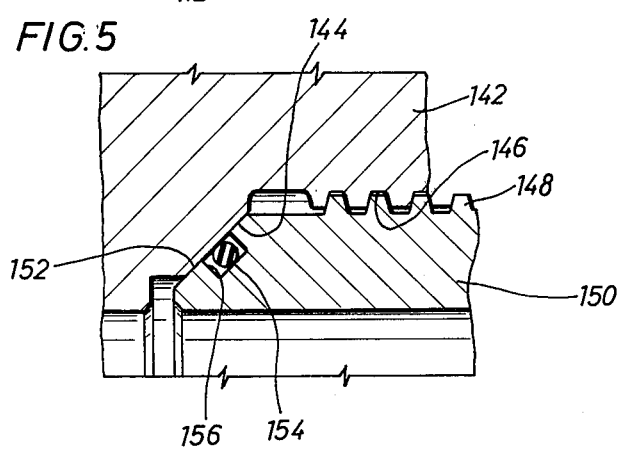

SWIVEL JOINT CONSTRUCTION FOR PRESSURE CONTAINING CONDUIT

FIELD OF THE INVENTION

This invention relates generally to a swivel construction for conduits enabling one conduit to be rotated relative to another while the conduits are under pressurized condition and transporting flowing fluid. More specifically, the present invention is directed to a swivel joint construction for flow lines such as might be interconnected between the blow-out preventer stack of deep well drilling apparatus and a choke-and-kill manifold that is provided to enable a well to be rapidly shut in in the event such becomes necessary.

BACKGROUND OF THE INVENTION

In the drilling of deep wells such as oil wells it is necessary to provide the oil well drilling equipment with some means to prevent the well from blowing out when a high pressure production zone is intersected by the well bore during drilled or when some malfunction occurs either to the well drilling apparatus or within the well itself. The well drilling apparatus is therefore typically provided with one or more blow-out preventers having hydraulically energized rams that are forced into engagement with the drill stem passing therethrough. The blow-out preventers cause gripping or in some cases crushing or positive deformation of the pipe structure in order to retain the pipe within the well and prevent it from being blown out of the well by high pressure well fluid. Immediately below the lowermost blow-out preventer of the well drilling structure may be provided an injection spool having a conduit connection allowing connection of a flow line to the spool structure, which flow line may be interconnected between the spool and the choke-and-kill manifold that is capable of injecting a high pressure medium, such as drilling mud, through the flow line and spool into the well at a pressure that counterbalances any pressure tending to force the drill stem out of the well. The fluid medium injected into the well from the choke-and-kill manifold is also used to seal or shut in a well when such is desired.

Because the choke-and-kill flow line must be capable of handling the flow of fluid at very high pressure, i.e., in the order of 5,000 to 10,000 psi or greater, it is very difficult to provide a flexible flow conduit that will safely handle the choke-and-kill fluid. One should bear in mind also that it is imperative that the choke-and-kill manifold and the flow line interconnecting the manifold with the spool of the drilling apparatus be capable of functioning without failure because the choke-and-kill system is typically the last resort in preventing well blow outs from occurring. The flow line must not rupture or leak.

One problem occurs frequently especially when drilling is being conducted from an offshore platform, the choke-and-kill flow line, if it is composed of rigid piping, is typically subjected to a great degree of stresses which stresses ar induced by movement of the derrick and platform structure relative to one another. It is inevitable that some relative derrick, platform and drilling head movement will occur because of the frequent adverse conditions under which drilling is accomplished and because the platform construction, being composed largely of fabricated steel structure, reacts to various forces acting thereupon. Rigid flow lines interconnecting relatively movable objects could become excessively strained and rupture within a relatively short period of time.

In the past, flexible conduits had been employed as choke-and-kill lines but, as indicated above, when extremely high pressures are expected to be encountered, it is very typically impractical to consider flexible flow line structures that will be capable of withstanding the internal pressure that could be applied thereto during choke-and-kill operations. Flow lines have been provided that incorporate rigid flow line sections, the various sections being interconnected by means of swivel joints that are variously oriented in such a manner as to account for relative movement between the choke-and-kill manifold, which is mounted on the well drilling platform, and the spool structure of the well drilling apparatus which is connected to a conductor conduit that extends downwardly through the platform apparatus and into the formation beneath the ocean floor. A major problem with the swivel jointed flow line mechanisms that have been provided is the fact that the swivel joints incorporate sealing elements that are incapable of withstanding the internal pressure applied thereto. In addition, the thrust bearings of the swivel joint structures are easily contaminated with the fluid contained within the flow line thereby causing rather rapid deterioration of the swivel joints themselves. Additionally, increase of pressure within presently available swivel joint constructions typically causes a subsequent increase in the friction retarding characteristics thereof which has a tendency to limit free movement of the swivel joint construction as well drilling operations are conducted. It is highly desirable therefore to provide a flow line construction for interconnection of the well drilling spool and the choke-and-kill manifold that will account for relative movement between the spool and the manifold and yet will maintain optimum sealing ability at all times. It is therefore a primary feature of the present invention to provide a novel swivel joint construction for flow lines that incorporate pressure enhanced sealing elements that provide leak free swivel joint operation at all of the pressure ranges thereof.

It is another important feature of the present invention to provide a novel swivel joint construction for flow lines wherein the swivel joint structure incorporates thrust bearings and the seal structure of the swivel joint construction effectively prevents contamination of the bearings by the fluid controlled by the flow line.

Among the several features of the present invention is noted to be contemplation of a novel swivel joint construction for flow lines wherein a swivel joint housing structure is provided that is not a pressure containing structure, but rather only provides mechanical support to withstand the thrust loading that is applied thereto in response to the pressure contained within the swivel joint structure.

It is also a feature of the present invention to provide a novel swivel joint construction incorporating a pair of relatively movable hubs that are retained by a housing constructon, the hubs being free for relative rotation throughout the entire pressure range of the swivel joint construction.

It is an even further feature of the present invention to provide a novel swivel joint construction for movable flow lines including opposed relatively rotatable hub elements with means for establishment of connection between flow sections and the respective hub elements that facilitates simple disassembly of the swivel construction for repair and for replacement of parts if necessary.

It is also an important feature of the present invention to provide a novel swivel joint construction for movable high pressure flow lines incorporating lubricating means that enable simple and efficient lubrication of the bearings of the swivel joint construction.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention. For example, although the present invention is described principally as it relates to utilization in conjunction with offshore drilling rigs, especially of the platform type, it is not intended in any way to limit the present invention to any particular type of drilling rig nor is it intended to limit utilization of the present invention in conjunction with drilling rigs. It is intended that the invention may have application, within the spirit and scope of the present invention, in any environment where relatively movable objects are connected by a flow line.

SUMMARY OF THE INVENTION

The swivel joint construction of the present invention may be utilized in conjunction with other identical or similar swivel joints in order to allow a flow line to have freedom of movement while maintaining a positive seal at each of the swivel joints, even though the flow line may be subjected to extremely high internal pressure. A pair of hub elements may be provided each having a thrust flange formed thereon and the hubs may be disposed in opposed relationship with the flanges being located within a housing that may be a two part sectional housing structure. To facilitate relative rotational movement between the flanges within the housing structure, a pair of thrust bearings may be interposed between the respective flanges and thrust surfaces formed on the housing structure, which bearings serve to transmit thrust loading from the flanges to the housing structure and yet allow each of the hubs freedom of rotational movement.

The hubs interfit to define an annular elongated seal recess, within which may be disposed an elongated seal carrier that forms a transition bridging the joint defined between the opposed hubs. The seal carrier may be related to the elongated recess in such a manner as to define a pair of seal pockets, within which may be disposed a primary sealing assembly that is pressure energized to enhance the sealing ability thereof and which prevents fluid within the flow passage of the swivel from flowing through the joint between the hubs. Each of the primary sealing elements may comprise a relatively hard annular sealing body, which may be composed of plastic material such as polytetrafluoroethylene or some other suitable relatively hard friction resistant plastic sealing material. The sealing body may be of substantially U-shaped cross-sectional configuration, defining opposed flanges or lips that are pressure activated to enhance the sealing ability thereof. The relatively hard sealing body is designed for a slight degree of mechanical deformation upon assembly of the swivel structure in order to provide an initial seal against wall structure defining the seal pocket within which it is contained. The sealing body is also formed to define an annular groove within which may be disposed a relatively soft elastomeric annular sealing element such as might be composed of Viton or some other suitable rubber-like sealing material. The elastomeric sealing element establishes sealing contact between the retainer element and the sealing body and is yieldable or movable responsive to increasing pressure to cause the sealing flanges or lips of the relatively hard sealing element to yield or be moved into tighter sealing engagement with the wall structure defining the seal pocket. The sealing ability of the primary seal assembly is therefore enhanced by fluid pressure applied thereto.

A plurality of annular seal grooves may also be formed in the exterior surface of the seal sleeve element, each of which may retain an annular sealing element establishing a plurality of secondary seals between the seal carrier element and the hubs.

The relatively hard friction resistant body portions or the primary sealing elements function, together with an annular friction resistant washer interposed between the thrust flanges of the hubs, in order to allow relative rotation of the hubs and the seal carrier element as one of the conduits is rotated relative to the swivel structure.

A pair of conduit connector elements may be received by respective ones of the hub structures of the swivel joint construction in order to provide a releasable relationship between the conduit and the respective hub. The conduit connector element may be disposed in engagement of the hub structure in such a manner as to provide a metal-to-metal sealing relationship that cooperates with an additional elastomeric sealing element to provide efficient sealing between hubs and the respective hub connector elements.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiments thereof which are illustrated in the appended drawings, which drawings form a part of this specification.

It is to be noted however that the appended drawings illustrate only typical embodiments of the invention and are therefore not to be considered limiting of its scope, for the invention may admit to other equally effective embodiments.

IN THE DRAWINGS

The present invention, both as to its organization and manner of operation, may be best be understood by way of illustration and example of certain preferred embodiments when taken in conjunction with the accompanying drawings in which:

FIG. 1 is a partial elevational view of a well head assembly and a choke-and-kill manifold structure, with a flow line interconnected between these structures, which flow line is shown to be provided with six swivel connections that are constructed in accordance with the present invention.

FIG. 2 is a sectional view taken along line 2—2 of FIG. 3 and illustrating a swivel joint constructed in accordance with the present invention.

FIG. 3 is a sectional view taken along line 3—3 of FIG. 2.

FIG. 4 is a fragmentary sectional view of the swivel construction set forth in FIG. 2, illustrating a portion of the seal carrier element and hub structure and showing the relationship of the primary and secondary seal structures to the seal carrier and hub structures.

FIG. 5 is a fragmentary sectional view of a portion of the swivel joint construction representing a modified embodiment of the present invention wherein a conduit connector element, provided with a conical extremity, having a seal groove formed therein and containing an annular sealing element, may be disposed in metal-to-metal sealing engagement with a mating conical seal surface defined with the hub structure.

FIG. 6 is an elevational view of a swivel joint constructed in accordance with the present invention and showing connection of the swivel joint to a flow line by means of flange connector structures.

FIG. 7 is a fragmentary sectional view of the relatively hard body portion of the primary seal assembly shown in the uncompressed condition thereof prior to assembly to the swivel joint structure.

DETAILED DESCRIPTION OF PREFERRED EMBODIMENTS

Referring now to the drawings and first to FIG. 1, there is shown a well head structure generally at 10 that is utilized during well drilling operations and which incorporates one or more blow-out preventers such as shown at 12 that are capable of functioning responsive to certain conditions, such as conditions of drastic change in pressure, to cause gripping of drill pipe that extends through the blow-out preventer structure and into the well. Immediately below the lowermost blow-out preventer may be provided a spool structure 14 having a conduit connection 16 formed integral therewith or connected thereto. A flow line, illustrated generally at 18, may be interconnected between the conduit connection 16 and a flow line connector element 20 of a choke-and-kill manifold 22. The flow line structure 18 may include a plurality of rigid flow line sections, such as shown at 24 and 26, that are interconnected by a plurality of swivel joints, such as shown at 28 and 30. Each of the swivel joints may be of substantially identical construction and may be constructed in accordance with the present invention. The swivel joints allow relative movement of the various flow line sections 24 and 26, such as might occur when portions of the drilling rig support structure yield or more relative to other portions that are bridged by the flow line structure. Valves 32 and 34 may be interconnected into the flow line structure and may control communication between the flow line and the interior of the spool 14. The plural valves 32 and 34 allow the flow line to be pressured up to or above the pressure within the spool 14 with one of the valves being maintained in the closed position thereof. The valves then may be opened selectively to communicate fluid form the choke-and-kill manifold 22 to the spool structure 14 for the purpose of killing the well in the usual manner.

With reference not to FIG. 2, each of the swivel joint mechanisms 28 and 30 may take the form illustrated generally at 36, where a pair of hub elements 38 and 40 of generally identical construction are shown to be displaced in slightly spaced relationship, being separated by an annular friction resisting washer 42. The washer 42 may be composed of polytetrafluoroethylene or any other suitable friction resisting material. Each of the hub elements 38 and 40 may be provided with an annular thrust transmitting flange, such as shown at 44 and 45, with the flanges being disposed in justaposed relation and being separated only by the friction resisting washer 42.

A swivel housing structure, such as that shown generally at 46, may be provided that may be composed of housing sections 48 and 50 that may be retained in assembly by bolts 52 and 54 that extend through apertures formed in one housing section and are threadedly received by the opposite housing section. The annular housing structure 46 may define a swivel chamber 56 within which the thrust transmitting flanges 44 and 45 may be retained. A pair of annular thrust bearings 58 and 60 may also be retained within the swivel chamber 56 and may be interposed between the respective thrust transmitting flanges 44 and 45 and thrust support surfaces 62 and 64 define by the housing structure. Lubricant passages 66 and 68 may be defined in the housing structure and may receive lubricant fittings 70 and 72 respectively in order to provide the bearings 58 and 60 with suitable lubrication. Lubricant fittings 70 and 72 are externally exposed, thereby allowing the swivel mechanism to be lubricated as is desirable to promote efficiency of servicing operations and to extend the useful life of the swivel joint construction.

It will be desirable to provide the swivel contruction with means for preventing fluid disposed therein from flowing through the joint between the hubs 38 and 40, which joint is occupied by the friction resisting washer 42, and thereby preventing the fluid from contaminating the bearings 58 and 60. In accordance with the present invention, each of the hub structures may be formed to define an internal annular recess, such as shown at 74 and 76, that cooperate when the hubs are in assembled position such as shown in FIg. 2, to define an elongated annular seal recess that is exposed to the flow passage 78 extending through the swivel construction. A seal carrier or retainer element 80 may be disposed within the elongated seal recess and may provide both primary and secondary sealing ability in order to prevent fluid within the flow passage 78 from reaching the bearings 58 and 60.

As illustrated in FIG. 2, the annular seal carrying element 80 provides a transition, bridging the space or joint defined between the opposed inner extremities of the hub elements 38 and 40 and cooperates with the hub structures to define a pair of primary seal pockets 82 and 84 within which may be contained a pair of primary seal assemblies 86 and 88, respectively. A plurality of annular grooves 90 may also be formed in the outer preiphery of the annular seal carrier element 80, which annular grooves may receive a plurality of annular sealing elements 92 that establish secondary seals between the seal carrier element and respective ones of the hubs 38 and 40.

Referring now to FIG. 4, the primary seal assembly 86 may be defined by a relatively hard or stiff annular sealing body 94 that may be considered of generally U-shaped cross-sectional configuration defining a pair of annular yieldable sealing flanges or lips 96 and 98. It is desirable that the annular sealing body 94 be of friction resistant characteristics in addition to being capable of providing sealing ability and, in accordance with the present invention, the sealing body may be composed of glass filled polytetrafluoroethylene or any other suitable relatively hard plastic sealing material.

Referring to FIG. 7, the annular sealing body, 94 in the uncompressed condition thereof, may be shown to have externally tapered surfaces 100 and 102 extending from an annular generally cylindrical base surface 104. The surfaces 100 and 102 may be tapered in the order of three degrees so as to cause the outer edges of the sealing flanges or lips 96 or 98 to make initial contact with side walls 106 and 108 of the sealing pocket 82. As the swivel structure is assembled, the annular sealing body will be deformed from its uncompressed state, shown in FIG. 7, toward the fully compressed condition thereof illustrated in FIG. 4. It is not necessary however that the annular sealing body be completely compressed as shown in FIG. 4, it only being necessary that the sealing body be sufficiently compressed to establish initial sealing contact with the side walls 106 and 108 in order to provide initial sealing capability exclusive of the pressure energized sealing capability to be discussed hereinbelow.

The annular sealing body 94 may also be formed to provide an annular groove 110 between the sealing lips 96 and 98, within which groove may be disposed a relatively soft annular sealing element 112 that substantially fits the major portion of the configuration of the groove 110. The annular sealing element 112 may be composed of Viton or any one of a number of other suitable elastomeric or rubber-like sealing materials within the spirit and scope of the present invention. The sealing element 112 conveniently takes the form of an O-ring that is subjected to a slight degree of initial compression in the unpressurized state of the swivel construction thereby establishing an initial seal between the seal carrier element 80 and the annular sealing body 94.

As pressure within the flow passage 78 is increased, pressure will enter the annular seal pocket 82 and will bear upon both the annular sealing body 94 and the elastomeric sealing element 112. Because an initial seal has been established between the annular sealing body 94 and the side surfaces 106 and 108 defining the primary seal pocket 82, initial leakage past the annular sealing body will be prevented. Pressure from the flow passage 78 will bear directly upon the annular sealing element 112, causing it to deform slightly because of its elastomeric composition. When this occurs, the force of the pressurized fluid is transmitted from the elastomeric sealing element 112 to the annular sealing lips 96 and 98 of the annular body, causing the lips to be urged more tightly against the respective side surfaces 106 and 108 of the primary seal pocket. Pressure therefore enhances the sealing ability of the seal assembly within the primary seal pockets, but the additional mechanical pressure that is developed between the annular sealing body, the hub and the annular seal carrier element 80 does not materially retard the capability of these parts to be free for relative movement because of the friction resistant composition of the annular sealing body.

The annular recesses 74 and 76 of the respective hubs define a cylindrical surface against which the secondary sealing elements 92 establish initial sealing contact upon assembly of the swivel mechanism. The secondary sealing elements 92 may be composed of any suitable elastomeric sealing material, such as Viton, for example. The secondary sealing elements, in addition to providing O-ring type sealing capability to prevent leakage of pressurized medium between the seal carrier element 80 and the cylindrical surface defining the respective recess 74 or 76, serve an additional function of preventing lubricant material from flowing from the swivel chamber to the primary seal assembly. As discussed above, lubricant material is injected into the chamber 56 through lubricant fittings 70 and 72. The secondary sealing elements 90 and 92 prevent the lubricant material from flowing from the swivel chamber 56 through the joint between the friction resisting washer 42 and the respective hubs where it might otherwise flow along the seal carrier element to the primary seal assembly. Additionally, annular sealing elements 114 and 116 such as Viton O-rings may be retained within appropriate grooves formed in the housing structure and may prevent lubricant from leaking from the swivel chamber.

Referring again to FIG. 2, it is considered desirable to provide means for separating the hub elements 38 and 40 from the respective flow line segments 24 and 26 and, according to the present invention, such may conveniently take the form illustrated in FIG. 2 where each of the hub elements may be provided with internal threads 118 and 120 that receive external threads 122 and 124 defined on a pair of connector and sealing subs 126 and 128. The subs may in turn be connected to respective flow line segments by welding, such as shown in FIG. 2, or by flange connection, such as illustrated in FIG. 6 at 130 and 132. Annular sealing elements 134 and 136 may be retained within respective annular grooves defined within the hub elements 30 and 40, which sealing elements establish sealing engagement with generally cylindrical sealing surfaces 138 and 140 that are defined at the inner extremities of each of the connector and sealing elements 126 and 128, respectively.

Referring now to FIG. 5, a modified embodiment of the present invention is depicted wherein the hub elements, such as shown at 142 may be provided with tapered internal sealing surfaces 144 that may be of generally frustoconical configuration. The hub elements 142 may be provided with an internally threaded portion 146 that receives the externally threaded portion 148 of a connector and sealing sub 150. The sub 150 may be provided with a tapered inner extremity defined by a generally frustoconical sealing surface 152 that is adapted to mate in metal-to-metal sealing engagement with the sealing surface 144 when the sub 150 is threaded to its full extent within the respective hub 142.

The sealing ability of the metal-to-metal seal established between the frustoconical surfaces 144 and 150 may be enhanced by an elastomeric O-ring type sealing element 154 that may be retained within an annular seal groove 156 in such a manner as to establish O-ring type sealing contact or slight compression of the sealing element 154 between a wall of the seal groove and the conical seal surface 144. By threading the connector elements 150 fully into engagement with the respective hub elements, a metal-to-metal seal is established by the cooperatively engaging tapered seal surfaces, which seal is enhanced by means of the contained elastomeric O-ring seal 154.

When the flow line segments are movable through connection thereof with other swivel structures, each of the various swivel devices are capable of being disassembled for the purpose of repair or replacement. After the housing structure has been separated from the hubs simply by removing the bolt 52 and 54, a flow line segment, together with its hub structure, may be moved linearly relative to the opposite hub structure, which not only separates the hubs but extracts the seal carrier element 80 from at least one of the recesses 74 and 76 defining the elongated seal carrier groove. After this has occurred, the hubs themselves may be unthreaded from the respective connected subs 126 or 128 for repair or replacement as desired. In the event it is desired to replace the bearings, the respective hub about which the bearing is disposed may be separated from the respective connector sub and the bearing structure may simply be removed from the cylindrical portion of the hub. After this has been accomplished, a replacement bearing may be installed on the hub and the hub may again be brought into connected relationship with the respective connector sub.

After the hub elements have been separated in the manner described above, the seal carrier element 80 may be withdrawn from the recess 74 or 76 and the primary and secondary seal elements may be replaced as desired, after which the seal carrier element may be reassembled to one of the hubs. The installation process will again cause the seal carrier element, with its replacement seals, to be received within the elongated seal groove defined by the cooperating recess 74 and 76 as the hubs are brought into assembled relationship as shown in FIG. 2

When the swivel structure is assembled, the thrust support surface 62 and 64 of the housing structure will cause the bearings and thrust transmitting flanges of the hub structure to be so positioned that the primary seal assemblies are caused to yield from the uncompressed condition thereof, shown in FIG. 7, toward a linearly compressed condition, where the sealing lips 96 and 98 are caused to move more closely together by the opposed side surfaces 106 and 108 of the respective primary seal pocket. An initial mechanical seal is formed thereby in addition to the initial mechanical seal formed by the secondary sealing elements between the seal carrier element and the respective hubs. Low pressure leakage will be prevented by this initial sealing capability. As pressure within the flow passage 78 increases, this pressure will enter the primary seal pockets and will act both upon the annular relatively hard sealing body 94 and upon the elastomeric annular sealing element 112. The effect of pressure will have a tendency to cause spreading of annular sealing lips, thereby further enhancing the sealing engagement between the lips and the respective side walls of the seal pocket. The sealing ability of the primary seal assemblies is therefore enhanced in direct proportion to increase in pressure within the flow passage 78.

In view of the foregoing, it is quite clear that a novel swivel structure has been provided for movable flow lines which is capable of maintaining a positive seal against leakage of fluid at all pressure ranges through incorporation of primary and secondary sealing elements that function to prevent such leakage. In addition, a swivel joint construction has been provided that effectively allows relative rotation of various sections of a segmented flow line construction and does not allow high stresses to be induced to the flow line structure that would otherwise cause rupture or malfunction thereof. A swivel construction has been provided that may be easily and simply disassembled for replacement or repair of parts thereof or, if desired, the entire swivel struction may simply be replaced, as long as at least one of the segments of the flow line structure is linearly movable relative to the opposite section thereof. Even though the swivel structure is readily rotatable, responsive to forces applied thereto, the swivel structure provides effective sealing capability at all pressure ranges thereof and functions also to prevent contamination of the bearings of the swivel structure by any leakage. The design and manufacturing costs of the swivel structure is maintained at a simple and low cost nature because the hub elements, together with the transition type seal assembly, are the only pressure containing structures of the swivel mechanism. The housing is not required to withstand the pressure of the fluid medium within the swivel structure and therefore does not need to be of sufficient strength to withstand the hoop stresses that will be caused by severely high pressure conditions. The housing structure is required only to withstand the thrust forces applied thereto by the thrust transmitting flanges through the thrust bearings. Swivel structure is also provided with an efficient lubrication system causing the bearings to be effectively lubricated during use. Moreover, the lubrication system is so designed as to promote simple and efficient lubrication servicing to enhance the service life of the swivel construction.

It is therefore seen that this invention is one well adapted to attain all of the features and advantages hereinabove set forth, together with other features and advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A swivel joint construction for movable flow lines, said swivel joint construction comprising:
    a pair of hub elements each having an opening formed therein, said elements cooperating to define flow passage means through said swivel joint and to define internal seal recess means, said hub elements being rotatably related;
    means for interconnecting said hub elements with a flow line;
    thrust transmitting flange means being provided on each of said hub elements, said thrust flange means being positioned in juxtaposed relation and defining a joint therebetween;
    friction resistant spacer means being interposed in said joint between said hub elements;
    housing means enclosing said thrust transmitting flange means of said hub elements and defining opposed thrust supporting shoulder means, said thrust transmitting flange means and said thrust supporting shoulder means cooperating to define a pair of annular thrust bearing receptacles;
    thrust bearing means being disposed within said thrust bearing receptacles between said thrust transmitting means of said hubs and said thrust supporting means of said housing means, said bearing means providing for said relative rotation of said hub elements and transmitting pressure induced thrust loads from said hub elements to said thrust supporting means of said housing means; and
    elongated annular transition seal means being disposed within said seal recess means and establishing fluid tight seals with each of said hub elements, said transition seal means bridging said joint.

2. A swivel joint construction as recited in claim 1, wherein:
    said hub elements are formed to define internal recesses, said recesses cooperating in the assembled condition of said hub elements to define said elongated internal seal recess, the joint between said hub elements being disposed intermediate the extremities of said elongted internal seal recess;

said elongated transition seal means being formed to define a pair of external primary recesses and a plurality of external secondary recesses and cooperating with said hub elements to define respective primary and secondary seal pockets; and sealing elements being disposed within said primary and secondary seal pockets and establishing primary and secondary seals between said transition seal means and said hub elements.

3. A swivel joint construction as recited in claim 1, wherein said elongated annular transition seal means is defined by an elongated structural element spanning the joint between said hub elements and cooperating with said hub elements to define a pair of opposed primary annular seal pockets and a plurality of secondary annular seal pockets;

a pair of primary sealing elements being disposed one within each of said primary annular seal pockets, said primary sealing elements establishing a primary fluid seal between said elongated structural element and respective ones of said hub elements; and at least a pair of secondary sealing elements being disposed one within each of said secondary sealing pockets and developing secondary seals between said elongated structural element and respective ones of said hub elements.

4. A swivel joint construction as recited in claim 1, wherein:

said elongated annular transition seal means includes an elongated annular structural element spanning the joint between said hub elements and cooperating with said hub elements to define opposed annular primary seal pocket means at each extremity of said elongated annular structural element; and a pair of annular seal elements being disposed one within each of said primary seal pockets, said seal elements establishing an initial mechanical seal and being responsive to pressure within said flow passage means for increasing the sealing ability thereof.

5. A swivel joint construction as recited in claim 4, wherein each of said annular seal elements comprise:

an annular sealing body being composed of sealing material having low friction characteristics and defining an inner seal groove therein, said annular sealing body defining yieldable sealing flanges on each side thereof that engage opposed walls of said primary seal pocket, said yieldable sealing flanges of said sealing body being deformed upon assembly of said swivel joint structure to provide an initial mechanical seal between said elongated structural element and said hub element; and an annular elastomeric sealing element being disposed within said inner seal groove and establishing a seal between said elongated structural element and said hub element, said elastomeric sealing element bearing against said yieldable sealing flanges of said outer sealing element.

6. A swivel joint construction for movable flow lines, said swivel joint construction comprising:

a pair of hub elements having an opening formed therein, said elements cooperating to define flow passage means through said swivel joint and to define seal recess means, said hub elments being rotatably related, each of said hub elements is formed to define an internal seal recess and said seal recesses of each of said hub elements, in the assembled relation of said hub elements, cooperate to define an elongated annular seal recess;

means for interconnecting said hub elements with a flow line;

thrust transmitting means being provided on said hub elements;

housing means enclosing said thrust transmitting means of said hub elements and defining thrust supporting means;

thrust bearing means being interposed between said thrust transmitting means of said hubs and said thrust supporting means of said housing means, said bearing means providing for said relative rotation of said hub elements and transmitting pressure induced thrust loads from said hub elements to said thrust supporting means of said housing means;

seal means being disposed within said seal recess means and establishing fluid tight seals with each of said hub elements, said seal means including an elongated annular structural element spanning the joint between said hub elements and cooperating with said hub elements to define opposed annular primary seal pocket means;

a pair of annular primary seal elements being disposed one within each of said primary seal pockets, said seal elements establishing an initial mechanical seal and being responsive to pressure within said flow passage means for increasing the sealing ability thereof;

each of said annular primary seal elements being an annular sealing body being composed of sealing material having low friction characteristics and defining an inner seal groove therein; and an annular inner sealing element being disposed within said inner seal groove and establishing seals with said outer sealing body and with said elongated annular structural element.

7. A swivel joint construction as recited in claim 6, wherein:

secondary sealing element means is interposed between said elongated annular structural element and said hub elements, said secondary sealing elements cooperating with said annular sealing elements to provide sealing between said elongated annular structural element and said hub elements.

8. A swivel joint construction for movable flow lines, said swivel joint construction comprising:

a pair of hub elements each havinng an opening formed therein, said elements cooperating to define flow passage means through said swivel joint and to define internal seal recess means, said hub elements being rotatably related;

internal threads being defined within each of said hub elements;

connector seal surface means being defined within each of said hub elments;

a pair of externally threaded connector subs being threadedly received by said internal threads of said hub elements;

connector seal means being interposed between said connector subs and said connector seal surface means and establishing a seal therebetween;

thrust transmitting flange means being provided on each of said hub elements, said thrust flange means being positioned in juxtaposed relation and defining a joint therebetween;

housing means enclosing said thrust transmitting flange means of said hub elements and defining opposed thrust supporting shoulder means, said thrust transmitting flange means and said thrust supporting shoulder means cooperating to define a pair of annular thrust bearing receptacles;

thrust bearing means being disposed within said thrust bearing receptacles between said thrust transmitting means of said hubs and said thrust supporting means of said housing means, said bearing means providing for said relative rotation of said hub elments and transmitting pressure induced thrust loads from said hub elements to said thrust supporting means of said housing means; and elongated annular transition seal means being disposed within said seal recess means and establishing fluid tight seals with each of said hub elements, said transition seal means bridging said joint.

9. A swivel joint construction as recited in claim 8, wherein:
abutment means is defined by said hub elements; and
said connector subs are disposed in engagement with said abutment means when said connector subs are fully received within said hub elements.

10. A swivel joint construction as recited in claim 8, wherein said swivel joint construction includes:
connector sub receiver means and receiver seal means provided on said hub elements; and
a pair of connector subs being received within said connector sub receiver means, each of said connector subs having sub seal means provided thereon, said sub seal means, in the fully assembled condition of said connector subs to said hub elements, being disposed in sealing engagement with said receiver seal means.

11. A swivel joint construction as recited in claim 10, wherein:
said receiver seal means is an annular seal surface; and
said sub seal means comprises annular seal elements being carried by said connector subs and being disposed in sealing engagement with said annular seal surface.

12. A swivel joint construction as recited in claim 10, wherein:
said receiver seal means is a generally conical surface;
said sub seal means is a generally conical surface mating with said conical surface of said hub elements.

13. A swivel joint construction as recited in claim 12, wherein:
an elastomeric sealing element establishes sealing engagement between said hub and said connector sub.

14. A swivel joint construction for movable flow lines, said swivel joint construction comprising:

a pair of relatively rotatable pressure containing elements each being connectable to sections of a flow line, said pressure containing elements being disposed in closely spaced relation and defining a joint therebetween;

a seal carrier element being disposed within said pressure containing elements and bridging said joint, said seal carrier element cooperating with said pressure containing elements to define a pair of primary seal pockets disposed one at each extremity of said seal carrier element;

a pair of primary seal assemblies being disposed one within each of said primary seal pockets, said primary seal assemblies including a relatively hard sealing body cooperating with said seal carrier element and said pressure containing elements to define annular seal chambers;

a relatively soft sealing element being disposed within each of said annular seal chambers and establishing seals within said seal chambers, the sealing capability of said primary seal assemblies being directly responsive to pressure conditions within said swivel joint construction; and means for retaining said pressure containing elements in assembly.

15. A swivel joint construction as recited in claim 14, wherein:
a plurality of secondary seal pockets are defined by the cooperative relationship between said seal carrier element and said pressure containing elements; and
a plurality of secondary sealing elements are contained within said secondary seal pockets and establish sealing relation between said seal carrier element and said pressure containing elements.

16. A swivel joint construction as recited in claim 14, wherein:
said relatively hard friction resistant annular sealing body is composed of a friction resistant plastic material; and
said relatively soft annular sealing element is composed of an elastomeric sealing material.

17. A swivel joint construction as recited in claim 14, wherein:
said relatively hard friction resistant annular sealing body is of generally U-shaped cross-sectional configuration defining a pair of annular sealing lips, said sealing lips establishing an initial mechanical seal between said pressure containing elements and said seal carrier element to prevent leakage of fluid;
an annular relatively, soft sealing element being disposed between said annular sealing lips.

18. A swivel joint construction as recited in claim 14, wherein:
a friction resisting element is disposed between said pressure containing elements.

* * * * *

UNITED STATES PATENT OFFICE
CERTIFICATE OF CORRECTION

Patent No. 3,997,198                                  Dated December 14, 1976

Inventor(s) Morris B. Linder

It is certified that error appears in the above-identified patent and that said Letters Patent are hereby corrected as shown below:

Column 5, line 60, "not" should read -- now --.
Column 6, line 51, "preiphery" should read -- periphery --.
Column 7, line 54, "relative movement" should read
--- relative rotational movement ---.
Column 11, line 3, "elongted" should read --- elongated ---.

Signed and Sealed this

Seventh Day of June 1977

[SEAL]

Attest:

RUTH C. MASON
*Attesting Officer*

C. MARSHALL DANN
*Commissioner of Patents and Trademarks*